Patented May 3, 1949

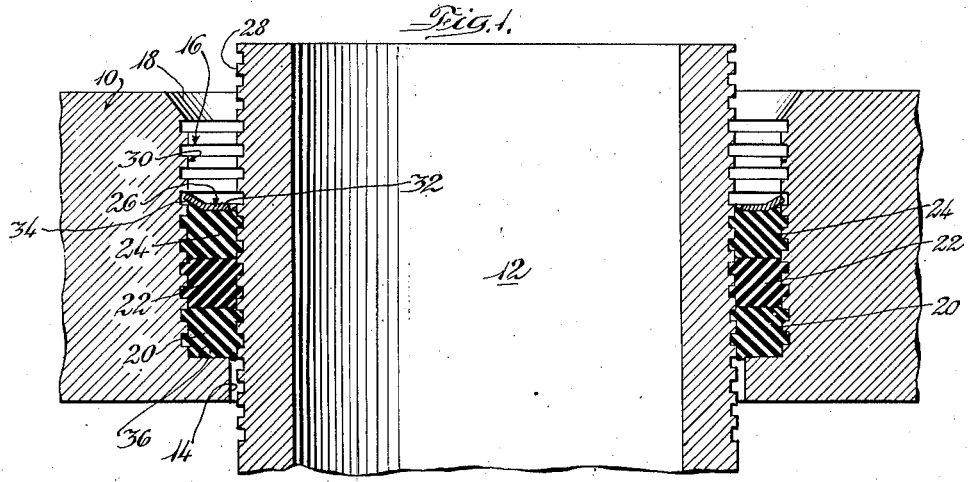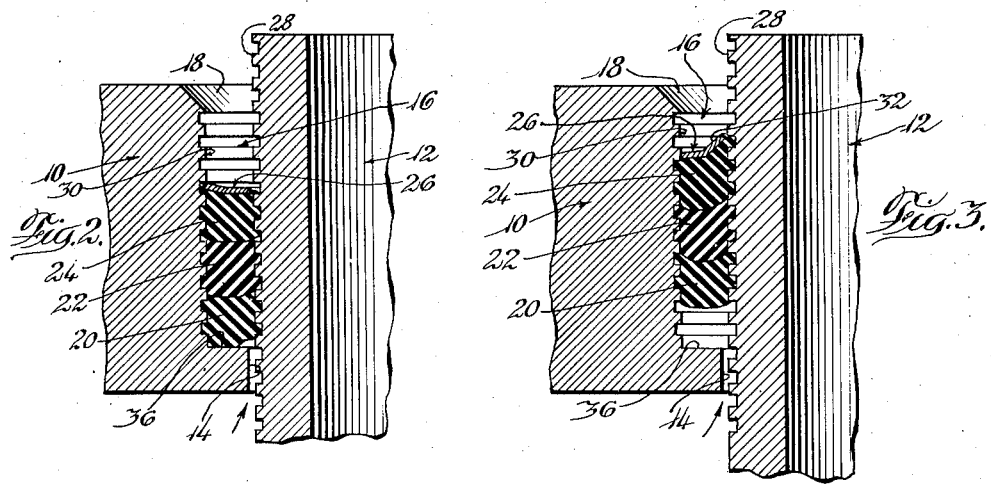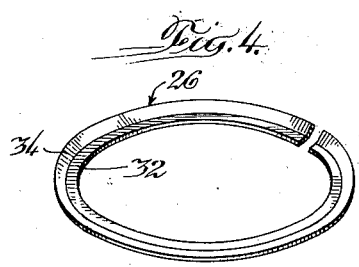

2,468,924

UNITED STATES PATENT OFFICE 2,468,924

SEAL

Edward W. Courtier, Harvey, Ill., assignor to Swenson Evaporator Company, Harvey, Ill., a corporation of Illinois Application December 29, 1945, Serial No. 637,860

1 Claim. (Cl. 285—30)

The present invention relates to a novel seal and particularly to an improvement in sealing tubes to tube sheets of tubular type heat exchangers and like installations. The present invention is an improvement over the invention of United States Letters Patent No. 2,281,594 dated May 5, 1942, and issued to William A. Pearl.

Heat exchangers of the tubular type are frequently constructed of a plurality of relatively long tubes having their ends secured in tube sheets, each of which forms a wall of a header chamber. The bundle of tubes is enclosed in a shell which is connected to a source of heat and pressure. Because the liquid which is being passed through the tubes frequently will react chemically with metal, it is desirable to construct the tubes of a nonmetallic material such as Karbate and consequently when the heat exchanger is in operation, different expansions take place among the tubes, tube sheets, and shell.

Compensation for these expansion differences is obtained by using a liquid and gas-tight seal between the tubes and tube sheet such as that described in Patent No. 2,281,594. This seal comprises one or more rubber-like annuli compressed into an annular groove provided between each tube and the tube sheet. The synthetic rubber is vulcanized by the heat and pressure in the heat exchanger, and it adheres to both the tubes and the tube sheet. While the heat and pressure deform the rubber-like annuli, there is no destruction of their resiliency and the tubes are free to move longitudinally of the tube sheet, the movement being absorbed in the shear distortion of the annuli rather than in slippage between the annuli and tube or tube sheet. Frequently, the openings of the tube sheets at opposite ends of the heat exchanger are not exactly coincident and the tubes are not exactly perpendicular to the tube sheet, and this type of seal permits a slight angular displacement of the tube relative to the tube sheet while providing liquid and gastight sealing and permitting longitudinal movement.

This seal has proved to be very satisfactory in relatively low pressure installations. When pressures over 25 p. s. i. are encountered in the heat exchanger, the rubber-like annuli have a tendency to separate from the tube or tube sheet and creep out of the annular groove, ultimately to leave this space. The undesirable results are obvious.

It might appear to be desirable to thread a ferrule or annular plug into the space between the tube and tube sheet, but this construction has two drawbacks or disadvantages. First, it limits the movement between the tube and tube sheet by compressing the rubber-like annuli and preventing utilization of the resilient characteristics of the material. If the tube is made of a brittle non-metallic material, it may be subjected to a shattering compressive stress. Second, such a ferrule or plug would necessarily require greater tube sheet area for installation than the rubber-like annuli. And one of the advantages of the sealing means of the William A. Pearl invention is the relatively large number of tubes per unit of tube sheet area, which number would be materially reduced if a threaded metallic retainer plug were to be used.

The present invention contemplates the provision of a seal between the tube and the tube sheet which permits movement of the tube relative to the tube sheet, seals against high pressures, and has all of the advantages claimed for the seal of Patent No. 2,281,594. It utilizes the rubber-like annuli which are sealed against the tube and the tube sheet but has a means of retaining the sealing medium in place over pressures of over 25 p. s. i., while simultaneously permitting the tube to move relative to the tube sheet, the movement being absorbed in shear distortion of the rubber-like annuli.

The principal object of the present invention is the provision of a novel leakproof seal capable of withstanding relatively high temperatures and pressures while permitting relative movement between the parts utilizing the seal.

Another object is to provide a novel seal incorporating a retaining means permitting flexure of the sealing material without failure of the seal.

Another object is to provide an improved seal incorporating means to prevent "blowing out" the sealing medium under relatively high pressures and temperatures.

A further object is to provide a novel seal having the aforementioned advantages which may be installed easily and quickly and without special tools, the application of heat, or a special machine operation.

Other objects and advantages will become apparent from the following description taken in conjunction with the drawing in which:

Fig. 1 is a cross sectional view of a fragment of a tube and a tube sheet of a tubular heat exchanger showing my novel seal after it has been installed;

Fig. 2 is a fragmentary cross sectional view of the seal of Fig. 1 illustrating the position of the seal parts after application of relatively high pressure and temperature;

Fig. 3 is a fragmentary cross sectional view of the seal of Fig. 1 illustrating the position of the parts after application of greatly excessive pressure; and Fig. 4 is a perspective view of the retainer ring, broken into section at one point to show its cross-sectional shape.

Referring to Figs. 1 to 3, the numeral 10 indicates a tube sheet supporting a tube 12 which may be formed of Karbate or some other non-metallic material which will not react chemically with the material flowing therethrough. The tube sheet 10 is provided with a bore 14 of a diameter slightly larger than the diameter of the tube 12 to permit relative angular as well as longitudinal movement between the tube and the tube sheet. The bore 14 communicates with a larger diameter bore 16 flaring outwardly at 18 at the surface of the tube sheet.

The seal is positioned in the annular groove formed between the larger diameter bore 16 and the tube 12 and comprises annuli 20, 22, 24, and a deformable circular metallic ring 26, the purpose of which will be more fully described hereinafter. The rubber-like annuli 20, 22, and 24 are preferably made of a synthetic material such as neoprene, or derivatives of butadiene and butyl rubber, which products are capable of vulcanization under the temperatures and pressures which are present in the heat exchanger.

The outer wall 28 of the tube and the inner wall 30 of the bore 16 are provided with a plurality of small annular ribs and grooves serving as anchors for the seal. The William A. Pearl patent describes fully the function of the rib and groove construction in anchoring the rubber-like annuli of the seal in position, and it has been found that this anchorage is sufficient to withstand pressures up to 25 p. s. i. applied against the seal through the bore 14. However, when pressures greater than 25 p. s. i. are encountered, the annuli are deformed to such an extent that they pull away from the ribbed surfaces of the tube and the tube sheet and creep out of the annular space therebetween. If an excessively high pressure is applied, the annuli may be "blown out" rapidly.

In order to prevent the egress of the annuli and the failure of the seal under high pressure, I insert a deformable metallic ring 26. This ring is brought into position with sufficient pressure to compress the annuli so that they become deformed and flow into the grooves between the ribs on the tube and the tube sheet, as illustrated in Fig. 1. The ring 26 is formed on its inner edge with a substantially flat continuous shelf 32 which presses against the upper side of the topmost annulus. Surrounding and coextensive with the shelf-like portion 32 is a flange 34 projecting upwardly and outwardly therefrom and making an obtuse angle therewith which is preferably approximately 150° at the time of installation.

The seal is assembled by positioning the tube 12 so that it projects through the bore 14 and takes the position shown in Fig. 1. The annuli 20, 22, and 24 are pressed into the annular space between the wall of the bore 16 and the tube 12 until they seat against shoulder 36. The ring 26 is then placed in the annular space and pressure is applied on the shelf 32 so that it tips downwardly at its inner edge permitting the flange 34 to ride over the ribbed surface 30 on the wall of the bore 16. Sufficient pressure is applied to the ring to compress the annuli 20, 22, and 24 and to cause the synthetic material to flow outwardly into the spaces between the ribs on both the tube 12 and the bore 16. When the pressure is relieved, the resiliency of the annuli moves the shelf 32 upwardly into approximately a horizontal position causing the outer edge of the flange 34 to catch beneath one of the ribs on the wall 30 (Fig. 1). The ring 26 is securely held in position and exerts considerable pressure on the annuli.

When the heat exchanger is placed in operation, liquid flows through the tube 12 and heat and pressure are applied to the outer surfaces of the tube and in the space between the tube sheets. This heat and pressure is transmitted to the seal through the bore 14 and vulcanizes the annuli so that they anchor themselves to the tube and the tube sheet. During the operation of the heat exchanger, the different coefficients of expansion of the tube, the tube sheet, and the shell cause different expansions of these elements and a relative movement between the tube and the tube sheet. Because the synthetic material retains its resiliency despite the application of heat and pressure, the movement between the tube and the tube sheet is taken up or absorbed in the shear plane of the annuli. The ring 26 is made of a deformable material so that it likewise can permit this movement.

Fig. 2 illustrates the position of the ring 26 after the heat exchanger has been in operation for some time under pressures in excess of 25 p. s. i. It is seen from this figure that the pressure coupled with the movement of the tube relative to the tube sheet has caused the shelf 32 to move upwardly and the obtuse angle between the shelf 32 and the flange 34 to approach 180°. This is obtained by the pivotal movement of the ring about the outer edge of the flange 34 which contacts the underside of one of the ribs in the wall 30. The pivotal movement is accompanied by a slight flattening of the ring. The ring 26 does not contact the tube because its inner diameter, when completely flattened, is slightly greater than the outer diameter of the tube 12. With the release of the pressure, the ring 26 does not completely restore itself to its former position, and it will retain a shape so that the angle between the shelf 32 and the flange 34 is between 150° and an angle approaching 180°. This does not adversely affect the retaining characteristics of the ring because the material has not been stressed to such an extent that it fails. Consequently, the pressure within the heat exchanger may be built up as frequently as desired to the former values with perfect safety, and the seal will remain in position and will retain its liquid and airtight characteristics.

However, should the pressure in the heat exchanger ever exceed the safety limits of the apparatus, the ring will either shear or will invert itself assuming the position shown in Fig. 3 with the flange 34 occupying a position which is substantially horizontal and the shelf 32 projecting upwardly and inwardly. As previously noted, the inner diameter of the ring 26 is greater than the outer diameter of the tube 10, and the inversion of the ring 26 does not cause it to contact the outer surface of the tube, which might otherwise be damaged. If excessive pressure is maintained in the heat exchanger, there will be a resultant failure of the seal with the "blowing out" of both the ring and the annuli. Since, however, this pressure would be considerably in excess of that required for normal operation of the heat exchanger, it is not contemplated that such failure would be of frequent occurrence which is presently the case with seals not incorporating the retainer ring 26.

Having thus described my invention, what I claim as new and desire to secure by Letters Patent is:

A pressure tight seal between a tube and a tube sheet having facing annular grooves and with an annulus of rubber-like material tightly fitting therebetween and into the grooves of the tube and tube sheet, characterized by a continuous metallic ring which bears against the low pressure side of the rubber-like annulus and has a continuous annular outer flange sloping outwardly toward the low pressure side of the tube sheet and projecting into the groove in the tube sheet and also having a continuous annular inner shelf portion integral with the outer flange and which lies in a plane perpendicular to the axis of but does not extend to the tube, said flange and shelf portion forming an angle of 150° therebetween before being deformed, said ring being made of a deformable metallic material so that when pressures in excess of twenty-five pounds per square inch are applied against the annulus from the high pressure side of the tube sheet the angle between said outer flange and said shelf portion approaches 180°.

EDWARD W. COURTIER.

REFERENCES CITED

The following references are of record in the file of this patent:

UNITED STATES PATENTS

| Number | Name | Date |
| --- | --- | --- |
| 1,265,090 | King | May 7, 1918 |
| 1,549,842 | McDonough et al. | Aug. 18, 1925 |
| 2,281,594 | Pearl | May 5, 1942 |

FOREIGN PATENTS

| Number | Country | Date |
| --- | --- | --- |
| 234,498 | Great Britain | Apr. 22, 1926 |
| 460,383 | Germany | May 25, 1928 |